S. D. MASTER.
TIRE.
APPLICATION FILED JULY 11, 1919.
1,346,503. Patented July 13, 1920.
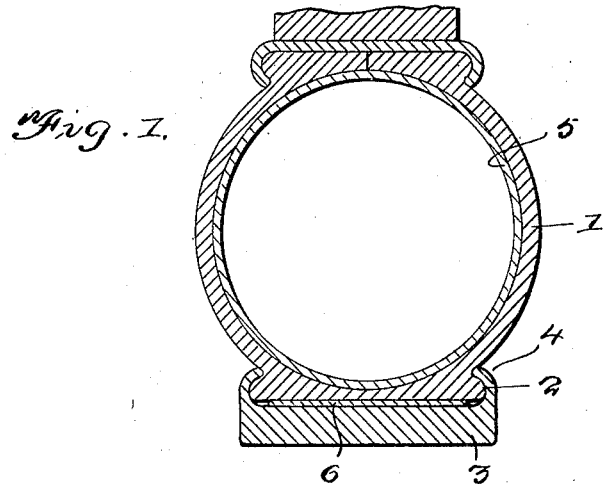
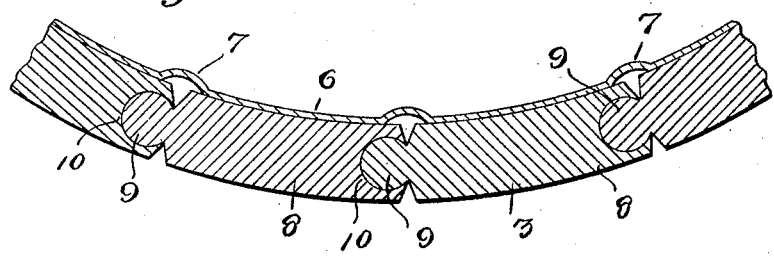
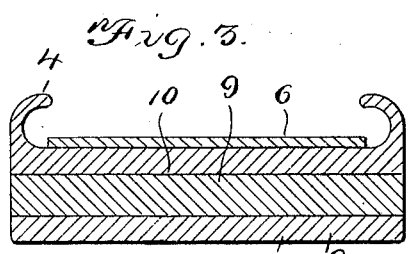
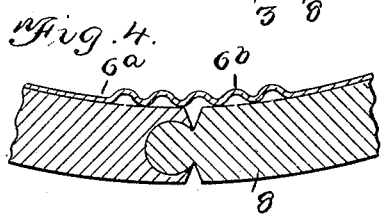
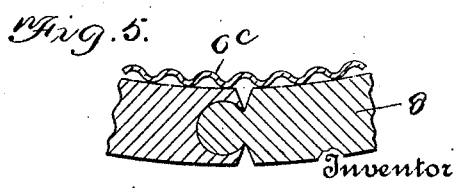

UNITED STATES PATENT OFFICE.

SHAVERKSHA D. MASTER, OF BROACH, INDIA.

TIRE.

1,346,503.

Specification of Letters Patent.   Patented July 13, 1920.

Application filed July 11, 1919. Serial No. 310,035.

*To all whom it may concern:*

Be it known that I, SHAVERKSHA DORABJI MASTER, a subject of the King of England, residing at Broach, India, have invented new and useful Improvements in Tires, of which the following is a specification.

My present invention pertains to tires and tire treads; and it consists first in the combination of a tire casing and a protective tread, and second, in the peculiar and advantageous tread construction as hereinafter described and definitely claimed.

In the accompanying drawings, hereby made a part hereof:

Figure 1 is a transverse section illustrative of the first part of my invention.

Fig. 2 is an enlarged detail longitudinal section illustrating my novel construction of tire tread.

Fig. 3 is a transverse section of the same.

Figs. 4 and 5 are views like Fig. 2, but illustrating modified metallic backings.

Fig. 6 is a transverse section illustrative of the modification hereinafter specifically referred to.

Reference will first be had to Fig. 1 to bring out and make clear the first part of my invention.

In furtherance of the said first part of my invention, I provide a tire casing 1 on its tread portion and at opposite sides of its longitudinal center with outwardly reaching ribs 2, and with the casing 1 characterized as stated, I combine a tread member 3 which may be of metal or of any other suitable material, and may be constructed in any approved manner, aside from the features presently set forth, without involving departure from the scope of the first part of my invention. The said tread member 3 is provided at or adjacent to its side edges with inwardly reaching flanges 4, and in these flanges 4 are designed to be seated the portions or flanges 2 of the casing 1, whereby the casing and the tread member will be securely connected together of themselves, and in such manner that the tread member will be enabled without detracting from the cushioning capacity of the inflatable tube 5 in the casing 1, to effectually protect the said casing against road-wear and injury.

By comparison of Figs. 2 and 3 the second part of my invention will be understood as consisting in a metallic backing 6, shown in the form of a continuous metallic plate, and with deflected portions 7 arranged at intervals, in combination with metallic sections 8 arranged at the outer side of the backing 6, though not connected thereto. The said metallic sections 8 are flexibly connected together and each is provided at its ends with inwardly directed flanges 4 designed to be engaged with a casing such as shown in Fig. 1 or a casing of either of the kinds disclosed in my contemporary applications (Cases A and B) filed July 11, 1919, and serially numbered 310,033 and 310,034 respectively. The flexibly connected sections 8 serve to confine and hold the metallic plate 6 against the casing, and by virtue of the flexible connections of the sections 8, the same serve to efficiently protect the casing against wear and injury, and at the same time do not interfere with the flexibility or elasticity or cushioning capacity of the inflatable tube in the casing.

As shown in Fig. 4, I may employ in lieu of the continuous straight metallic plate 6, a plate $6^a$ that is partly straight and is partly corrugated, as indicated by $6^b$; the corrugated portions being disposed opposite the play spaces provided between the adjoining ends of the sections 8.

In Fig. 5 is shown another modification in which the metallic plate indicated by $6^c$ is transversely corrugated throughout its length, with a view to contributing to the springiness of the construction.

In the embodiment of my invention shown in Figs. 2 and 3, the sections 8 are flexibly connected together of themselves and without the employment of extraneous means, by providing each section 8 at one end with a trunnion portion 9, disposed in a complementary socket bearing 10 in the adjoining end of the next adjacent section, in which case the backing plate will operate to prevent the said sections being moved transversely of the tread member and thereby separated from each other.

When the construction shown in Fig. 6 is employed, it is not necessary to employ a backing plate, inasmuch as in the latter construction the trunnion portions $9^a$ of the sections $8^a$ are upset, as indicated by $11^a$, against the end portions of the sections in which the socket bearings $10^a$ are provided.

When deemed expedient, the metallic backing may be employed, with a view to preventing frictional wear of the casing against the flexibly connected sections of the tread member, but I do not desire to be understood as confining myself to the combination of the flexibly connected sections with the backing member.

Having described my invention, what I claim and desire to secure by Letters-Patent, is:

1. A tread member for tires comprising flexibly connected sections arranged end to end, in combination with a metallic backing plate; the said plate being straight and having inward deflections opposite the spaces between the flexibly connected sections.

2. A tread member for tires comprising flexibly connected sections arranged end to end, in combination with a metallic backing plate; the said plate being straight and having transversely corrugated portions at intervals opposite the spaces between the flexibly connected sections.

3. A flexible tread member for tires comprising sections having socket bearings at one end and trunnion portions at their opposite ends, disposed in said socket bearings; said trunnion portions being upset against the ends of the portions in which the socket bearings are carried.

In testimony whereof I affix my signature.

SHAVERKSHA D. MASTER.